US008086580B2

(12) United States Patent
Sachedina et al.

(10) Patent No.: US 8,086,580 B2
(45) Date of Patent: Dec. 27, 2011

(54) HANDLING ACCESS REQUESTS TO A PAGE WHILE COPYING AN UPDATED PAGE OF DATA TO STORAGE

(75) Inventors: Aamer Sachedina, Newmarket (CA); Matthew Albert Huras, Ajax (CA); Keriley Kay Romanufa, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 1836 days.

(21) Appl. No.: 11/034,518

(22) Filed: Jan. 11, 2005

(65) Prior Publication Data
US 2006/0155774 A1  Jul. 13, 2006

(51) Int. Cl.
*G06F 7/00* (2006.01)
(52) U.S. Cl. ....................................... 707/704
(58) Field of Classification Search ........................ None
See application file for complete search history.

(56) References Cited

U.S. PATENT DOCUMENTS

| 5,163,148 | A  | * | 11/1992 | Walls ............................. 707/204 |
| 5,794,228 | A  |   | 8/1998  | French et al. |
| 5,870,758 | A  | * | 2/1999  | Bamford et al. .............. 707/201 |
| 5,956,731 | A  | * | 9/1999  | Bamford et al. .............. 707/201 |
| 6,012,059 | A  | * | 1/2000  | Neimat et al. ..................... 707/8 |
| 6,064,805 | A  |   | 5/2000  | McCrory et al. |
| 6,314,478 | B1 |   | 11/2001 | Etcheverry |
| 6,581,205 | B1 | * | 6/2003  | Cochrane et al. ............. 717/140 |
| 2005/0033720 | A1 | * | 2/2005  | Verma et al. ...................... 707/1 |
| 2005/0216462 | A1 | * | 9/2005  | Xiao ................................. 707/8 |
| 2005/0289188 | A1 | * | 12/2005 | Nettleton et al. ............. 707/200 |
| 2005/0289189 | A1 | * | 12/2005 | Nettleton et al. ............. 707/200 |

* cited by examiner

*Primary Examiner* — John E Breene
*Assistant Examiner* — Christopher J Raab
(74) *Attorney, Agent, or Firm* — David W. Victor; Konrad Raynes & Victor LLP

(57) ABSTRACT

Provided are a method, system, and program for handling access requests to a page while copying an updated page of data to storage. An update to a page in a memory is received and indication is made that the page has an exclusive lock. The update is applied to the page and an operation is initiated to copy the updated page to a physical log in a storage in response to applying the update to the page. Reads and writes are allowed to proceed against the page while the operation to copy the updated page to the physical log in the storage is occurring.

26 Claims, 5 Drawing Sheets

HANDLING ACCESS REQUESTS TO A PAGE WHILE COPYING AN UPDATED PAGE OF DATA TO STORAGE

BACKGROUND OF THE INVENTION

1. Field of the Invention

The present invention relates to a method, system, and program for handling access requests to a page while copying an updated page of data to storage.

2. Description of the Related Art

A Database Management System (DBSM) typically logs updates to database records in persistent storage to use to recover the records in the event of a system or program failure. In one known system, the DBMS writes updates to a logical log in persistent storage before writing the updated page from the memory buffer pool to persistent storage (the database) Further, the DBMS may also make a copy of the updated page in the memory, before the update, to a physical log in storage. During recovery, the page is accessed from the physical log and placed in the DBMS memory buffer pool. Updates in the logical log in persistent storage are then applied to the page from the physical log in the buffer pool to reproduce the updated page in the DMBS buffer pool. Applying updates from the logical log may be applied during recovery to increase the speed of the recovery.

SUMMARY

Provided are a method, system, and program for handling access requests to a page while copying an updated page of data to storage. An update to a page in a memory is received and indication is made that the page has an exclusive lock. The update is applied to the page and an operation is initiated to copy the updated page to a physical log in a storage in response to applying the update to the page. Reads and writes are allowed to proceed against the page while the operation to copy the updated page to the physical log in the storage is occurring.

Further provided are a method, system, and program for receiving an update to a page in a memory; indicating the page as having an exclusive lock; applying the update to a first page copy of the page; initiating an operation to copy the updated first page copy to a physical log in a storage in response to applying the update to the first page copy; allowing reads and writes to proceed against the page while the operation to copy the updated first page copy to the physical log in the storage is occurring; receiving a subsequent update to the page while the first page copy is being copied to the physical log in the storage; copying the first page copy to a second page copy in the memory in response to receiving the subsequent update; and allowing the subsequent update to proceed against the second page copy.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
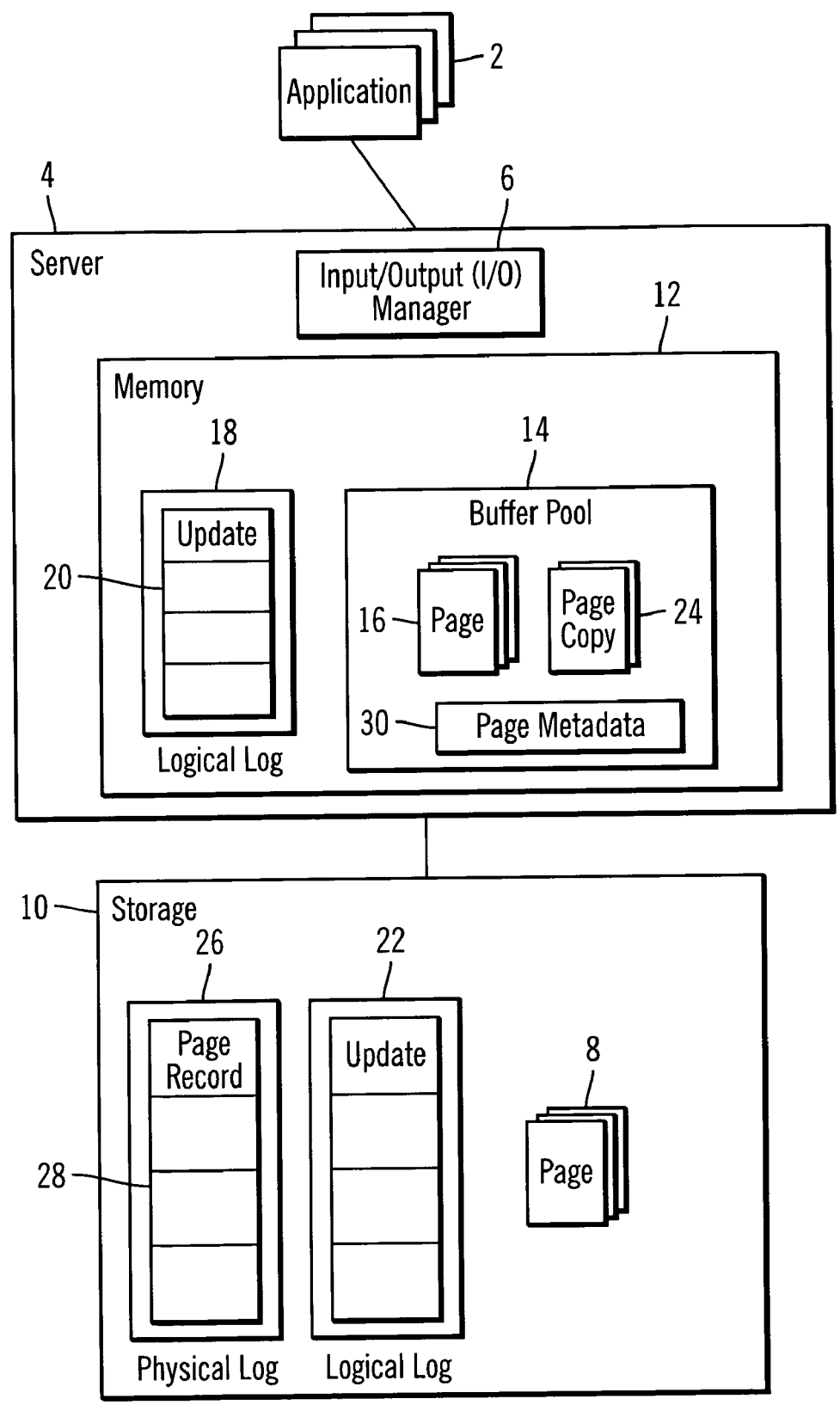
FIG. 1 illustrates an embodiment of a computing environment.

FIG. 1 illustrates a computing environment having a plurality of applications 2 that communicate Input/Output (I/O) requests to a server 4 directed toward data maintained in pages 8 in a storage 10. An I/O manager 6 manages the execution of the I/O requests with respect to the requested data in a page 8 in storage 10. A page comprises any data structure storing data, records, etc. that are the subject of access requests submitted to the I/O manager 6. The server 4 includes a memory 10, such as a non-volatile memory device, in which the I/O manager 6 maintains information used to manage I/O requests. When a page 8 in the storage 10 is requested, the I/O manager 6 stages the page 8 into a buffer pool 14, having pages 16, which are copies of the pages 8 in storage 10. The I/O manager 6 further maintains an logical log 18 having update records 20 of the updates to the pages 16 in the buffer pool 14. The logical log 18 is copied to the storage 10 as logical log 22. In one embodiment, the update record 20 for an update is written to the logical log 22 in storage 10 before the page 16 is written to persistent storage 10.

When applying updates to a page 16 in the buffer pool 14, the I/O manager 6 may copy the page 6 to a page copy 24 in the buffer pool 14, or some other area of memory 12, and then copy the page 16 to a physical log 26 in the storage 10. The physical log 26 includes page records 28 comprising the updated pages from the buffer pool 14. In the event of a failure and during the subsequent recovery, the I/O manager 6 reads the pages from the physical log 26 in the storage 10 into the buffer pool 14, which may comprise a sequential circular file. The updates in the logical log 22 are applied to the pages reproduced from the physical log 26 to recover the committed updates.

Figure 2:
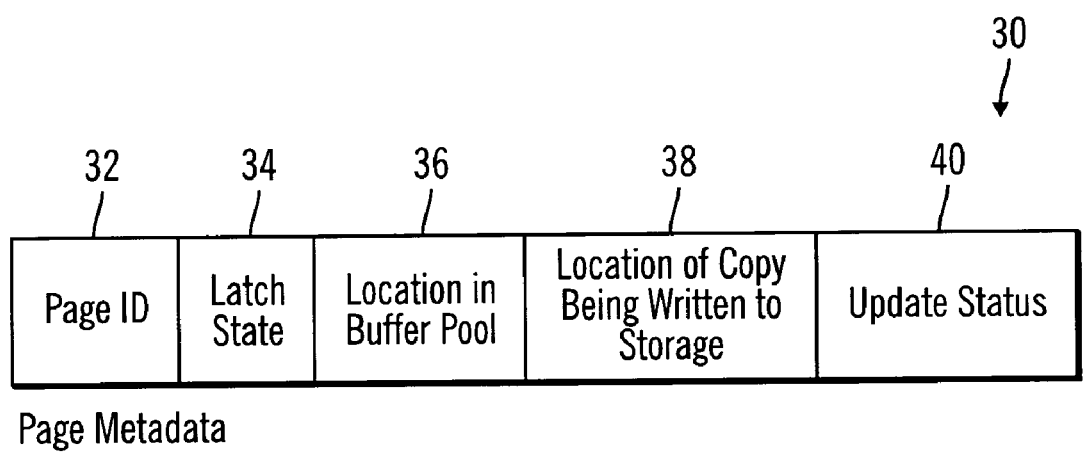
FIG. 2 illustrates an embodiment of page metadata.

The I/O manager 6 maintains page metadata 30 providing information on the pages 16 in the buffer pool 14. FIG. 2 illustrates an embodiment of information included in the page metadata 30, including a page identifier 32, a latch state 34, a location of the page in the buffer pool 36, a location of a page copy being written to storage 38, and an update status 40. The page identifier (ID) 32 provides an identification of the page 8 maintained in storage 10 to which the requests are directed. The latch state 34 indicates whether the access request accessing the page holds a lock on the identified page, such as an exclusive lock for write access, shared lock for read access, no lock if no access or a fourth lock discussed below. The location 36 indicates the location of a copy 16 of the page to which requests are directed in the buffer pool 14. The location 38 indicates the location of a page copy 24 of the identified page which is being written to the physical log 26. The update status 40 indicates whether the copy of the page 16 in the memory 12 has been updated since being staged into the buffer pool 14, i.e., is dirty or clean.

The applications 2 may execute within the server 4 or execute on separate computing devices that connect to the server 4 over a network or other transmission medium, such as a wired connection or wireless connection. The server 4 may comprise one or more computational machines, such as one or more servers, suitable for handling transaction requests from the applications 2. The applications 2 may comprise applications known in the art that transmit I/O requests to access data in the storage 10. In one embodiment, the applications 2 may comprise database clients, the I/O manager 6 may comprise a database management system (DBMS) server, and the pages 8 may store database records. The storage 10 may comprise non-volatile storage systems known in the art, such as one or more interconnected hard disk drives, a tape library, optical library, etc. The storage 10 may comprise hard disk drives configured as a Redundant Array of Independent Disks (RAID) array, Direct Access Storage Device (DASD), Just a Bunch of Disks (JBOD), etc.

Figure 3:
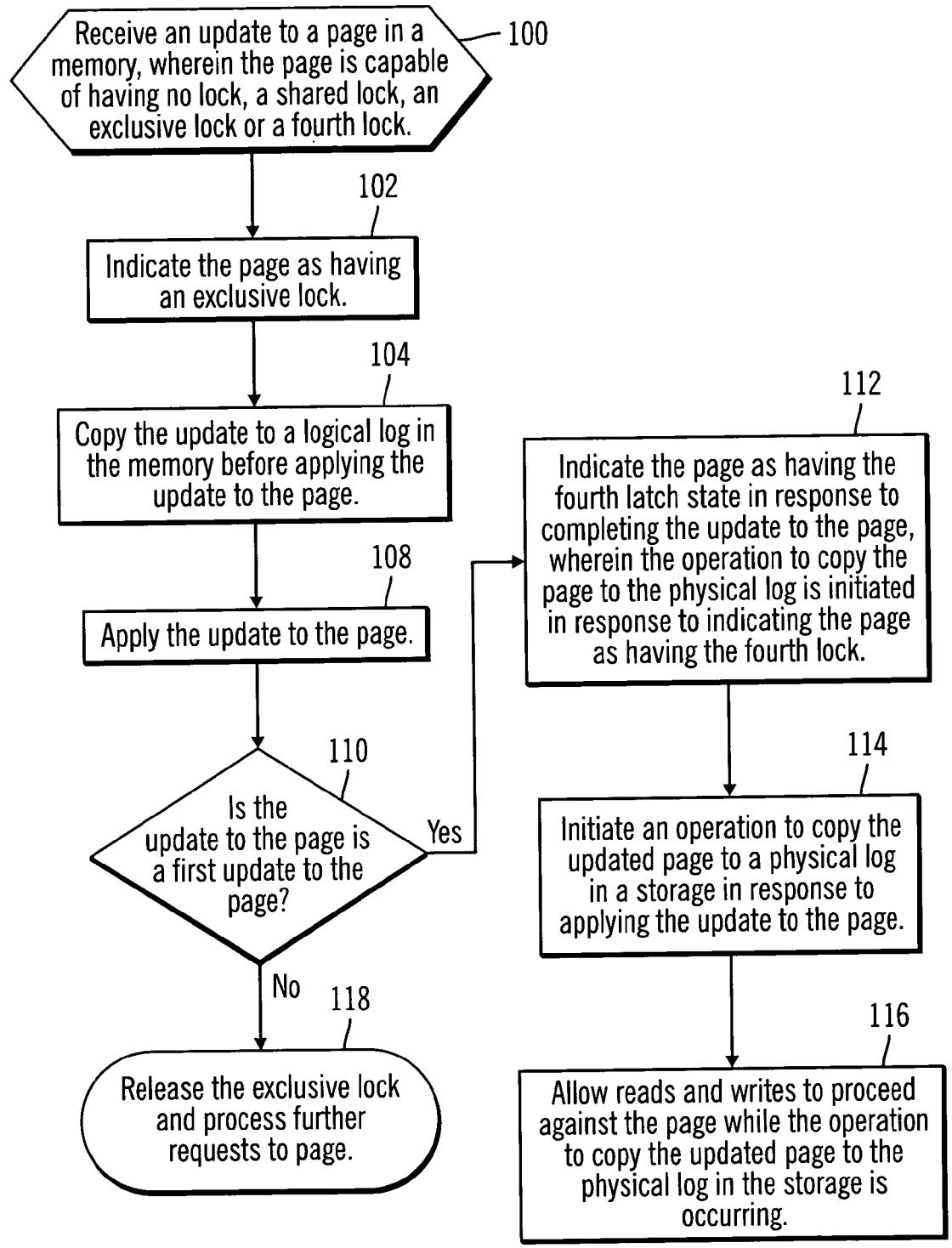
FIGS. 3, 4, 5, and 6 illustrate embodiments of operations to make copies of an updated page to a physical log in storage.

FIG. 3 illustrates an embodiment of operations the I/O manager 6 performs to execute I/O requests directed to pages 8 in storage 10. Control begins when the I/O manager 6 receives (at block 100) an update to write to a page 8 in the storage 10. The I/O manager 6 caches a copy 16 of pages 8 in the buffer pool 14. The page is capable of having a latch state 34 of no lock, a shared lock, an exclusive lock or a fourth lock. The page 16 is indicated (at block 102) as having an exclusive lock, which may involve updating the page latch state 34 in the page metadata 30 for the page to indicate an exclusive lock for the writing of the update. The update is copied (at block 104) to the logical log 18 in the memory 12. The update is then applied (at block 108) to the page 16. In one embodiment, the update record 20 in the logical log 18 is written to the logical log 22 in the storage 10 before the update is applied to the page 16. Further, alternatively steps 104 and 108 may be performed in reverse order. However, the log record for an update is written to the persistent storage 10 before the page is written.

If (at block 110) the update to the page 16 is a first update since the page 8 was staged into the buffer pool 14, which may be determined from the update status field 40 in the page metadata 30, then the I/O manager 6 indicates (at block 112) the page 16 as having the fourth latch state after completing the update to the page 16. The latch state may be indicated by updating the latch state 34 field in the page metadata 30 to indicate this fourth latch state. Further, the operation to copy the page 16 to the physical log 26 in the storage 10 may be initiated in response to indicating the page 16 as having the fourth latch state, where the fourth latch state may be indicated after applying the update to the page 16 and releasing the exclusive lock on the page. If (at block 110) the update is not the first update to the page 16 since the page was staged into the buffer pool 14, i.e., the page has already been updated (is dirty), then the copy operation may not be initiated to copy the further updated page 16 to the physical log 26 in storage 10. In such an embodiment, only the first updated page is copied to the physical log 26 to use for recovery. Further updates to the page 16 may be recovered from the logical log 22 in the storage 10. In an alternative embodiment, the page 16 may be copied to the physical log 26 in the storage 10 after additional updates to the page.

The fourth latch state may exist while the updated page 16 is being copied to the physical log 26 in storage. During this time, reads and writes are allowed (at block 116) to proceed against the page while the operation to copy the updated page 16 to the physical log 26 in the storage 10 is occurring.

Figure 4:
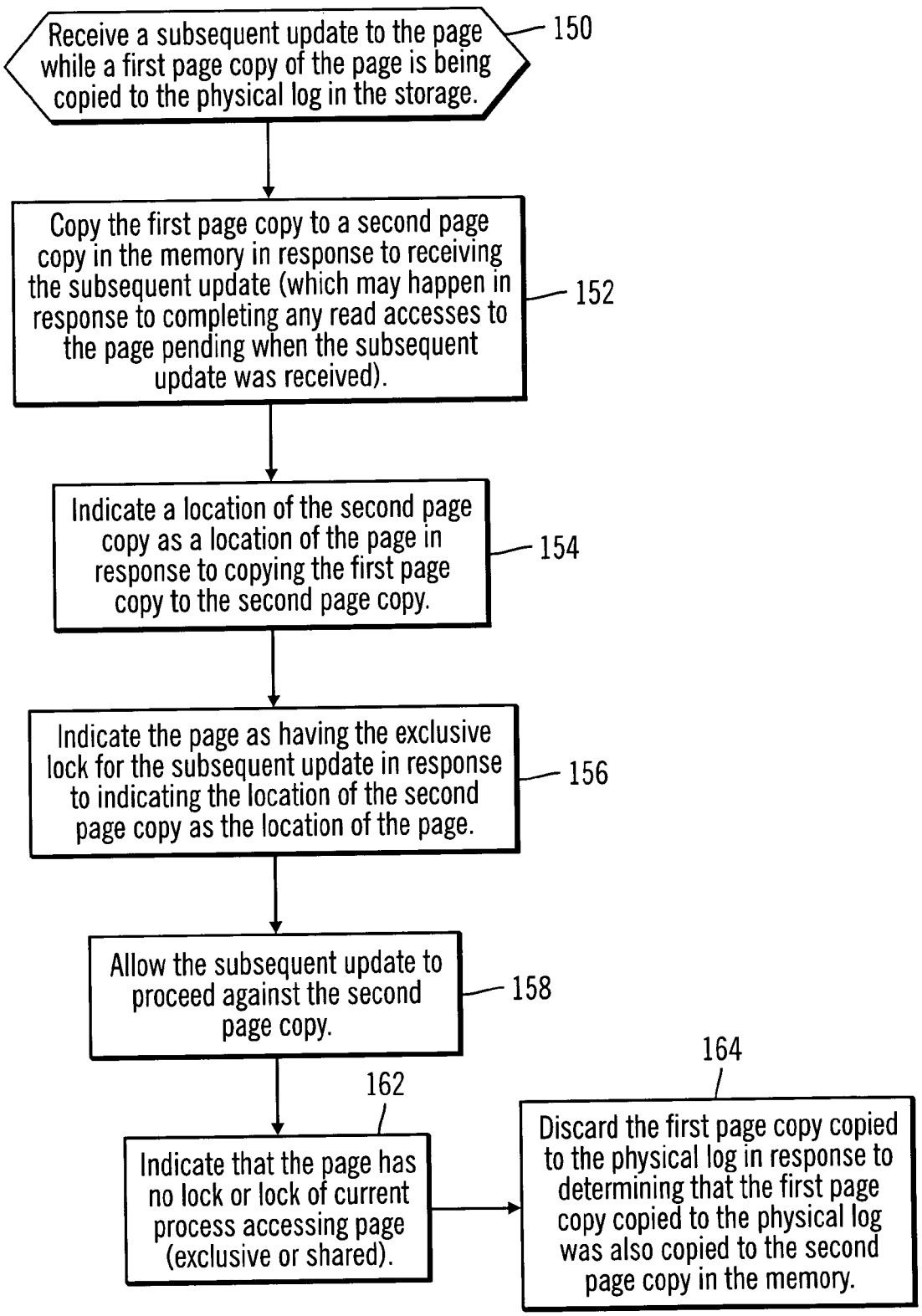

FIG. 4 illustrates operations performed by the I/O manager 6 to handle requests directed toward the updated page while the copy of the page 16 is being copied to the physical log 26 in the storage 10, i.e., the update is received while the page is in the fourth latch state. In one embodiment, in the fourth latch state, read requests require no special handling. In FIG. 4, the page 16 comprises a first page copy of the page 8 in storage 10 having the page ID 32. The location in the buffer pool 14 of the first page copy 16 would be indicated in the location field 36 in the page metadata 30 for the page. In response to receiving (at block 150) a subsequent update to the page, i.e., page 8 in the storage 10, while the first page copy 16 is being copied to the physical log 26 in the storage 10, the I/O manager 6 copies (at block 152) the first page copy 16 to a second page copy 24 in the buffer pool 14 in the memory 14. In one embodiment, the second page copy 24 is made and the update to the first page copy 8 is allowed to proceed to page copy 24, the copy of page 16 in the memory, after completing any read accesses to the first page copy 16 pending when the subsequent update was received. A location of the second page copy 24 in the memory buffer pool 14 is indicated (at block 154) as a location of the page in response to copying the first page copy 16 to the second page copy 24. In one embodiment, the location of second page copy 24 in the buffer pool 14 is indicated in the location field 36 of the page metadata 30 for the page indicating a copy of the page, having page ID 32, in the buffer pool 14. The I/O manager 6 further indicates (at block 156) the page as having the exclusive lock for the subsequent update after indicating the location of he second page copy 24 as the location 36 of the page. The subsequent update is then allowed (at block 158) to proceed against the second page copy 24

After the update to the second page copy 24 completes, the I/O manager 6 indicates that the page has no lock or the lock of current process accessing page (exclusive or shared) by updating the latch state 34 in the page metadata 34 for the page. The first page copy 16 copied to the physical log 26, i.e., the memory copy 16, is discarded (at block 162) after completing copying the first page copy 16 to the physical log 26.

The operations of FIG. 4 allow read and write accesses against the page to proceed while copying the first page copy 16 of the page to the physical log 26 in the storage 10 by making a copy 24 to which update requests can be directed.

Figure 5:
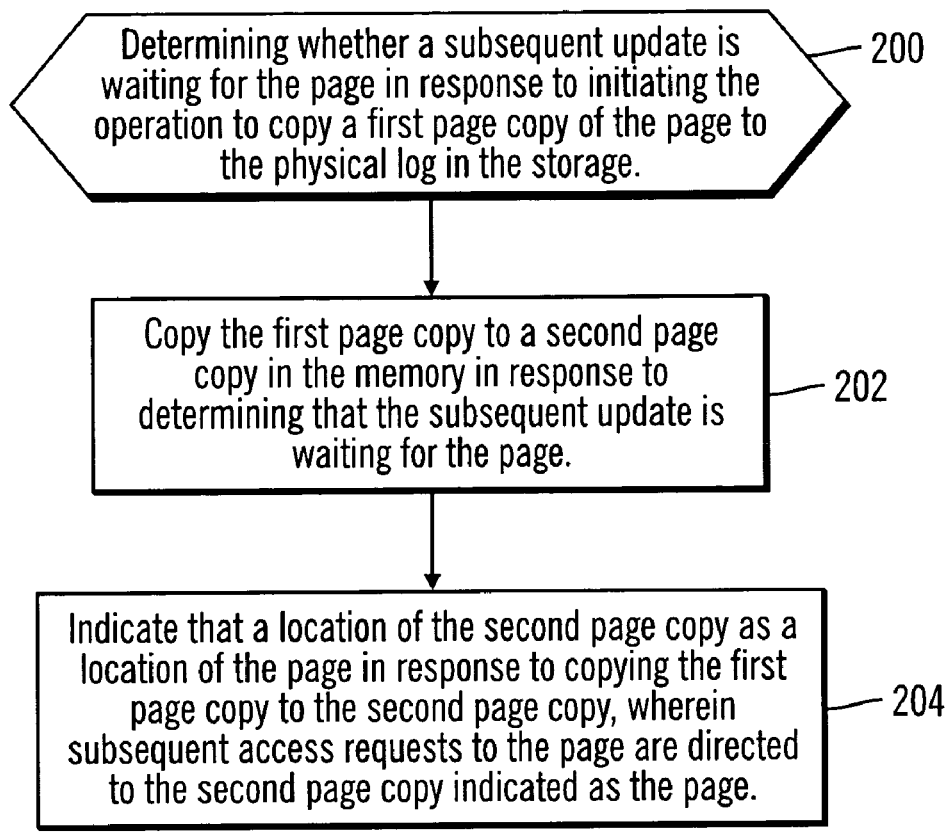

FIG. 5 illustrates an alternative embodiment to determine when to make the second page copy 24. A determination is made (at block 200) of whether a subsequent update is waiting for the page in response to initiating the operation to copy the first page copy 16 of the page to the physical log 26 in the storage 10. If there is a subsequent update waiting, then the first page copy 16 is copied (at block 202) to a second page copy 24 in the buffer pool 14 in the memory 12. The I/O manager 6 then indicates (at block 204) that a location of the second page copy 24 in the buffer pool 14 is a location of the page, which may be indicated in field 36 of the page metadata 30, after copying the first page copy 16 to the second page copy 24.

With the embodiment of FIG. 5, the second page copy is made when the copy operation to the physical log is initiated so that the second page copy is available to receive updates when the subsequent update is processed. In this way, the subsequent update does not have to wait for the first page copy 16 to be copied to the second page copy 24 because this copy operation is performed before the subsequent update is processed.

Figure 6:
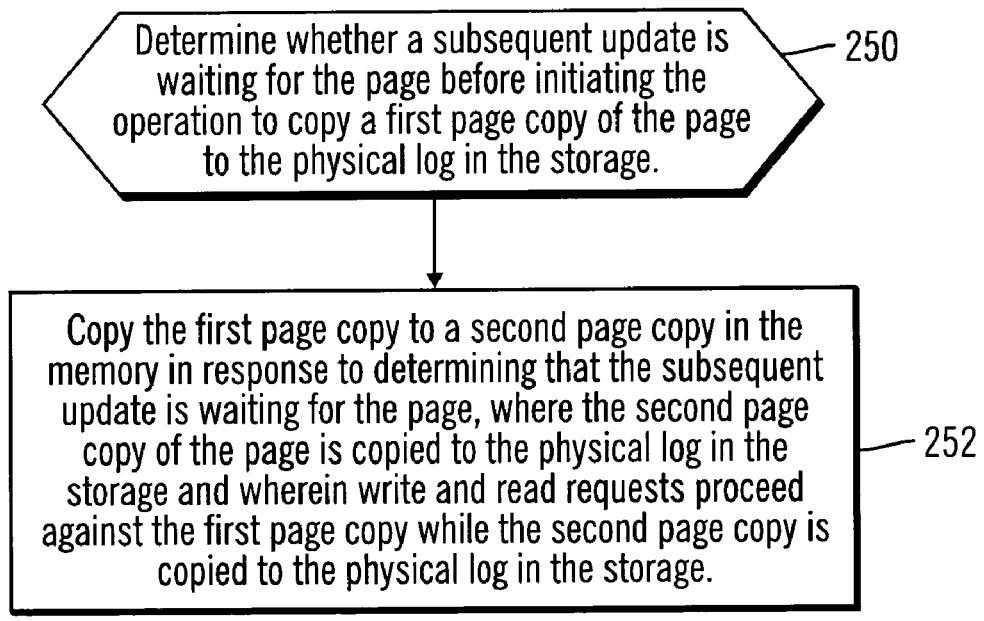

FIG. 6 illustrates an alternative embodiment on how to use the second page copy 24. A determination is made (at block 250) of whether a subsequent update is waiting to access the page before initiating the operation to copy the first page copy 16 of the page to the physical log 26 in the storage 10. If a subsequent update is pending, then the first page copy 16 is copied (at block 252) to a second page copy 24 in the buffer pool 14 in the memory 12. The second page copy 24 is then copied to the physical log 26 in the storage 10 and the write and read access requests proceed against the first page copy 16 while the second page copy 24 is being copied to the physical log 26.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

The illustrated operations of FIGS. 3-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   receiving an update to a page in a memory;
   indicating the page as having an exclusive lock;
   applying the update to a first page copy of the page;
   initiating an operation to copy the updated first page copy to a physical log in a storage in response to applying the update to the first page copy;
   allowing reads and writes to proceed against the page while the operation to copy the updated first page copy to the physical log in the storage is occurring;
   receiving a subsequent update to the page while the first page copy is being copied to the physical log in the storage;
   copying the first page copy to a second page copy in the memory in response to receiving the subsequent update; and
   allowing the subsequent update to proceed against the second page copy.

2. The method of claim 1, wherein the page is capable of having no lock, a shared lock, an exclusive lock or a fourth lock, further comprising:
   indicating the page as having the fourth lock in response to completing the update to the first page copy, wherein the operation to copy the first page copy to the physical log is initiated in response to indicating the page as having the fourth lock.

3. The method of claim 1, further comprising:
   copying the update to a logical log in the memory before applying the update to the first page copy; and
   writing the logical log in the memory to the storage.

4. The method of claim 1, further comprising:
   determining whether the update to the page is a first update to the page, wherein the operation to copy the first page copy to the storage is performed in response to determining that the update is the first update to the page.

5. The method of claim 1, further comprising:
   indicating a location of the second page copy as a location of the page in response to copying the first page copy to the second page copy.

6. The method of claim 5, further comprising:
   indicating the page as having the exclusive lock for the subsequent update in response to indicating the location of the second page copy as the location of the page.

7. The method of claim 1, wherein the operations of copying the first page copy to the second page copy and allowing the subsequent update to proceed against the second copy page are performed in response to completing any read accesses to the first page copy pending when the subsequent update was received.

8. The method of claim 1, further comprising:
   discarding the first page copy in response to determining that the first page copy was copied to the second page copy in the memory.

9. The method of claim 1, further comprising:
   determining whether the first page copy was copied to the second page copy in response to completing the operation of copying the first page copy to the physical log in the storage; and
   indicating that the page has either the read lock or no lock in response to determining that the first page copy was not copied to the second page copy.

10. The method of claim 1, further comprising:
    determining whether the subsequent update is waiting for the page in response to initiating the operation to copy the first page copy to the physical log in the storage, wherein the first page copy is copied to the second page copy in the memory in response to determining that the subsequent update is waiting for the page; and
    indicating a location of the second page copy as a location of the page in response to copying the first page copy to the second page copy, wherein subsequent access requests to the page are directed to the second page copy indicated as the location of the page.

11. The method of claim 1, further comprising:
  determining whether the subsequent update is waiting for the page before initiating the operation to copy the first page copy to the physical log in the storage, wherein the first page copy is copied to the second page copy in the memory in response to determining that the subsequent update is waiting for the page, and wherein the second page copy of the page is copied to the physical log in the storage and wherein write and read requests proceed against the first page copy while the second page copy is copied to the physical log in the storage.

12. A system, comprising:
  a processor;
  a memory in communication with the processor;
  a computer readable medium having code executed by the processor to perform operations, the operations comprising:
    receiving an update to a page in the memory;
    indicating the page as having an exclusive lock;
    applying the update to a first page copy of the page;
    initiating an operation to copy the updated first page copy to a physical log in a storage in response to applying the update to the first page copy;
    allowing reads and writes to proceed against the page while the operation to copy the updated first page copy to the physical log in the storage is occurring;
    receiving a subsequent update to the page while the first page copy is being copied to the physical log in the storage;
    copying the first page copy to a second page copy in the memory in response to receiving the subsequent update; and
    allowing the subsequent update to proceed against the second page copy.

13. The system of claim 12, wherein the page is capable of having no lock, a shared lock, an exclusive lock or a fourth lock, wherein the operations further comprise:
  indicating the page as having the fourth lock in response to completing the update to the first page copy, wherein the operation to copy the first page copy to the physical log is initiated in response to indicating the page as having the fourth lock.

14. The system of claim 12, wherein the operations further comprise:
  copying the update to a logical log in the memory before applying the update to the first page copy; and
  writing the logical log in the memory to the storage.

15. The system of claim 12, wherein the operations further comprise:
  determining whether the update to the page is a first update to the page, wherein the operation to copy the first page copy to the storage is performed in response to determining that the update is the first update to the page.

16. An article of manufacture comprising at least one of hardware including hardware logic and a computer readable storage medium including code for communication with a memory in a computer, wherein the code is capable of causing operations to be performed, the operations comprising:
  receiving an update to a page in the memory;
  indicating the page as having an exclusive lock;
  applying the update to a first page copy of the page;
  initiating an operation to copy the updated first page copy to a physical log in a storage in response to applying the update to the first page copy;
  allowing reads and writes to proceed against the page while the operation to copy the updated first page copy to the physical log in the storage is occurring;
  receiving a subsequent update to the page while the first page copy is being copied to the physical log in the storage;
  copying the first page copy to a second page copy in the memory in response to receiving the subsequent update; and
  allowing the subsequent update to proceed against the second page copy.

17. The article of manufacture of claim 16, wherein the page is capable of having no lock, a shared lock, an exclusive lock or a fourth lock, wherein the operations further comprise:
  indicating the page as having the fourth lock in response to completing the update to the first page copy, wherein the operation to copy the first page copy to the physical log is initiated in response to indicating the page as having the fourth lock.

18. The article of manufacture of claim 16, wherein the operations further comprise:
  copying the update to a logical log in the memory before applying the update to the first page copy; and
  writing the logical log in the memory to the storage.

19. The article of manufacture of claim 16, wherein the operations further comprise:
  determining whether the update to the page is a first update to the page, wherein the operation to copy the first page copy to the storage is performed in response to determining that the update is the first update to the page.

20. The article of manufacture of claim 16, wherein the operations further comprise:
  indicating a location of the second page copy as a location of the page in response to copying the first page copy to the second page copy.

21. The article of manufacture of claim 20, wherein the operations further comprise:
  indicating the page as having the exclusive lock for the subsequent update in response to indicating the location of the second page copy as the location of the page.

22. The article of manufacture of claim 16, wherein the operations of copying the first page copy to the second page copy and allowing the subsequent update to proceed against the second copy page are performed in response to completing any read accesses to the first page copy pending when the subsequent update was received.

23. The article of manufacture of claim 16, wherein the operations further comprise:
  discarding the first page copy in response to determining that the first page copy was copied to the second page copy in the memory.

24. The article of manufacture of claim 16, wherein the operations further comprise:
  determining whether the first page copy was copied to the second page copy in response to completing the operation of copying the first page copy to the physical log in the storage; and
  indicating that the page has either the read lock or no lock in response to determining that the first page copy was not copied to the second page copy.

25. The article of manufacture of claim 16, wherein the operations further comprise:
  determining whether the subsequent update is waiting for the page in response to initiating the operation to copy the first page copy to the physical log in the storage wherein the first page copy is copied to the second page copy in the memory in response to determining that the subsequent update is waiting for the page; and indicating a location of the second page copy as a location of the page in response to copying the first page copy to the second page copy, wherein subsequent access requests to the page are directed to the second page copy indicated as the location of the page.

26. The article of manufacture of claim 16, wherein the operations further comprise:

determining whether the subsequent update is waiting for the page before initiating the operation to copy the first page copy to the physical log in the storage, wherein the first page copy is copied to the second page copy in the memory in response to determining that the subsequent update is waiting for the page, wherein the second page copy of the page is copied to the physical log in the storage and wherein write and read requests proceed against the first page copy while the second page copy is copied to the physical log in the storage.

* * * * *